United States Patent [19]

Norman et al.

[11] Patent Number: 4,988,493

[45] Date of Patent: Jan. 29, 1991

[54] PROCESS FOR PRODUCING IMPROVED CARBON BLACKS

[75] Inventors: Don T. Norman, Houston; Gary L. Marney, Dumas, both of Tex.

[73] Assignee: Witco Corporation, New York, N.Y.

[21] Appl. No.: 117,021

[22] Filed: Nov. 4, 1987

[51] Int. Cl.$^5$ .................. C01B 31/02; C09C 1/48
[52] U.S. Cl. .................. 423/450; 423/449; 423/455; 423/457
[58] Field of Search ............ 423/450, 457, 455, 449

[56] References Cited

U.S. PATENT DOCUMENTS

| | | | |
|---|---|---|---|
| 3,256,065 | 6/1966 | Latham, Jr. | 23/259.5 |
| 3,256,066 | 6/1966 | Higgins | 23/259.5 |
| 4,013,760 | 3/1977 | Huschka et al. | 423/449 |
| 4,071,496 | 1/1978 | Kraus et al. | 260/42.36 |
| 4,327,069 | 4/1982 | Cheng | 423/450 |
| 4,360,627 | 11/1982 | Okado et al. | 524/496 |
| 4,383,973 | 5/1983 | Cheng | 422/151 |
| 4,391,789 | 7/1983 | Estopinal | 423/457 |
| 4,447,401 | 5/1984 | Casperson et al. | 422/151 |
| 4,477,621 | 10/1984 | Sato et al. | 524/496 |
| 4,478,973 | 10/1984 | Misono et al. | 524/496 |
| 4,500,672 | 2/1985 | Suzuki et al. | 524/496 |
| 4,540,560 | 9/1985 | Henderson et al. | 423/445 |
| 4,548,980 | 10/1985 | Nagata et al. | 524/495 |
| 4,645,657 | 2/1987 | Lee et al. | 423/457 |
| 4,678,830 | 7/1987 | Sato et al. | 524/495 |

*Primary Examiner*—Gregory A. Heller
*Attorney, Agent, or Firm*—Lockwood, Alex, FitzGibbon & Cummings

[57] ABSTRACT

A new process and apparatus for producing carbon black is provided and unique reactor with separate carbon black forming reaction zones is described. The process utilizes such a reactor to give unique carbon blacks which give rise to low hysteresis loss and good wear when used in rubber compounds for reinforcement and particularly in rubber tires.

16 Claims, 4 Drawing Sheets

PRIOR ART

PROCESS FOR PRODUCING IMPROVED CARBON BLACKS

This invention relates to a process and apparatus for producing carbon blacks which, when used in rubber compounds for reinforcement, impart both high resilience and high abrasion resistance properties to the resultant carbon black-containing rubber compounds.

BACKGROUND OF INVENTION

In recent years, there has been a worldwide demand to improve the fuel efficiency of automobiles in order to conserve the world's limited supply of petroleum based hydrocarbons.

Studies have indicated that a relatively large amount of the energy consumed by an automobile is used to overcome the rolling resistance of its tires, caused by hysteresis losses in the tire tread compounds. Therefore, automobile manufacturers have put rigid specifications on original equipment tires to reduce rolling loss by hysteresis, while maintaining treadwear resistance, traction, and handling characteristics. As these specifications become more and more demanding, the tire suppliers have asked their suppliers of polymers and carbon black, the two largest components in tires, to assist them by producing materials that will decrease hysteresis losses in tire tread compounds.

Carbon black producers have been active in trying to develop new grades of carbon black that impart good treadwear properties with decreased hysteresis properties, while maintaining satisfactory traction and handling characteristics. It has been found that changing the balance between treadwear and hysteresis properties of carbon black is very difficult to achieve by conventional manufacturing methods. In general, decreases in hysteresis values are accompanied by decreases in treadwear resistance, and vice versa.

In a carbon black reactor with a linear flow pattern (see FIG. 1), it is customary to inject carbon black feedstock oil through multiple hydraulic spray nozzles into a hot combustion gas stream emanating from a combustion zone located upstream of the carbon black feedstock oil injection point. It is further customary to inject the atomized carbon black feedstock oil radially inwardly and/or outwardly at essentially a right angle to the direction of flow of the hot combustion gas stream, in order to disperse the feedstock oil uniformly into the hot combustion gas stream. The total flow of carbon black feedstock oil is metered as a single stream even though this stream is subdivided into multiple streams for injection into the hot combustion gas stream.

Patently the foregoing techniques utilizing the reactors currently employed do not provide carbon black products with the aforedescribed desiderata.

PRIOR ART

The following references are illustrative of the various apparatus and processes used for making carbon blacks:

| U.S. PAT. | | |
| --- | --- | --- |
| 3256065 | 3256066 | 4013760 |
| 4071496 | 4327069 | 4360627 |
| 4383973 | 4391789 | 4447401 |
| 4477621 | 4478973 | 4500672 |
| 4540560 | 4548980 | 4645657 |

| -continued |
| --- |
| U.S. PAT. |
| 4678830 |

None of these patents describes and/or teaches the elements and concepts hereinafter set forth as features of the present invention.

It has now been discovered that the balance between hysteresis and treadwear values achieved by conventional manufacturing methods can be favorably improved upon by modifications in the carbon black formation process.

In this invention, the supply of carbon black feedstock oil is divided into two or more streams, each separately metered and controlled. These separated feedstock oil streams are then injected through multiple hydraulic spray nozzles into separate cross sectional zones of the hot combustion gas stream emanating from the upstream combustion chamber of the reactor. These injection zones containing atomized carbon black feedstock oil are separated both laterally and longitudinally in the reactor, so that two or more separate parallel carbon black forming reactions are made to occur simultaneously in the reactor. By controlling the amount of feedstock oil injected into each of the separated injection zones, carbon black products of similar or widely ranging particle sizes and/or specific surface areas can be produced simultaneously in the reactor. This method of carbon black feedstock oil injection provides a means of producing carbon black particles of a much wider size range than would normally occur when using conventional methods of feedstock oil injection.

Those skilled in the art of carbon black manufacturing are aware that carbon black products consist almost entirely of aggregates of multiple carbon black particles fused to one another to form clusterlike and/or chainlike aggregate shapes. These aggregates, variable in both size and shape, are predominantly formed in the reaction zone of the reactor, where highly turbulent flow of the process gas stream, containing carbon black particles, occurs. Particle collisions, under high temperature conditions in the reactor reaction zone, causes the particles to fuse into aggregates.

It is postulated but by no means to be considered limitative of the present invention that the carbon black aggregates created by this invention are different from those created by conventional methods in that the aggregates formed by this invention are composed of a much wider range of particle sizes than those formed by conventional methods. It is believed that this change in aggregate composition plays a major role in achieving the improved dynamic properties demonstrated by the use of carbon blacks produced by this invention.

It is therefore an object of this invention to provide an apparatus and process by which carbon blacks, imparting improved dynamic properties and good treadwear in the tire tread compounds in which they are used for reinforcement, may be produced.

It is a further object of this invention to provide an apparatus and process by which carbon blacks may be produced with dynamic properties similar to conventionally produced carbon blacks, but with improved treadwear resistance in the rubber compounds in which they are used.

It is a still further object of this invention to provide new and improved carbon blacks.

DETAILED DESCRIPTION OF THE INVENTION

Figure 1:
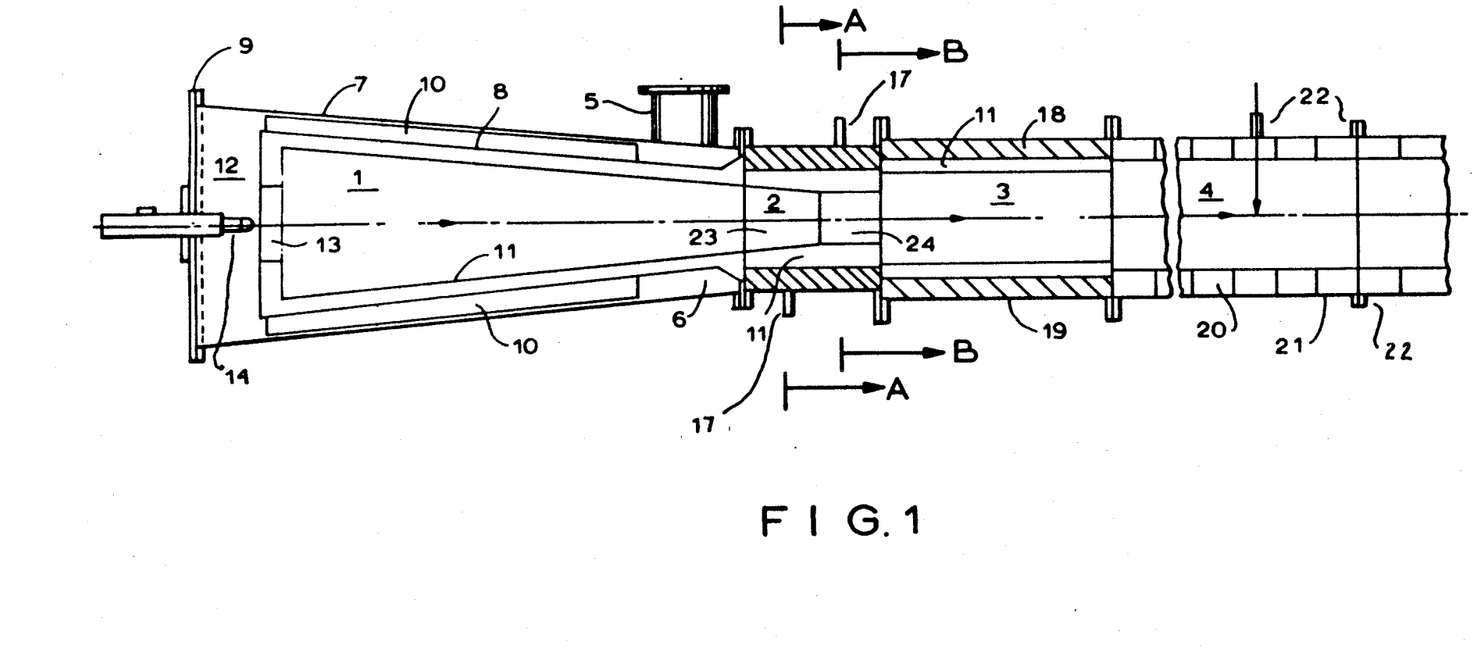
FIG. 1 is a longitudinal sectional view of a typical carbon black reactor or furnace used to carry out the process described in this invention.

The carbon black reactor shown in FIG. 1 is a modular type reactor. The term modular is used to denote that the reactor is composed of modules or sections, each having a specific function, with the modules joined together sequentially so as to provide a means to carry out the carbon black manufacturing process in a continuous stepwise manner.

In longitudinal sequence, the reactor is divided into four sections or modules. Referring to FIG. 1, Section 1 is a combination air distribution and combustion zone, Section 2 is a carbon black feedstock oil injection zone, Section 3 is a reaction zone, and Section 4 is a reaction quench zone.

In operation, preheated air for combustion is supplied to the carbon black reactor under sufficient pressure to overcome the pressure drops encountered in the reactor and downstream equipments. This air enters the reactor through conduit 5 and into the annular space 6 between outer reactor shell 7 and the inner combustion chamber shell 8. The air then travels in a direction toward the reactor head 9 through the annular space 6 between the outer and inner shells, 7 and 8.

Multiple longitudinal vanes 10 are located in the annular space 6. These vanes 10 are rigidly attached to the inner combustion chamber shell 8 and serve three purposes. Firstly, they impart a linear, non-swirling, flow direction to the air stream. Secondly, they provide heat transfer surfaces to conduct heat from the refractory lining 11 surrounding the combustion zone 1, through the inner shell 8 and vanes 10 into the air stream. This heat transfer further serves to partially cool the refractory lining 11 and allow higher flame temperatures to be maintained in combustion zone 1. Thirdly, the vanes 10 provide a mechanical support to keep the inner combustion chamber shell 8 concentrically located inside the reactor outer shell 7.

After passing through the vaned portion of annular space 6, the combustion air passes through an air plenum chamber 12, located adjacent to the reactor head 9, and thence into the combustion zone 1 through a concentric circular orifice 13, located at the upstream end of combustion zone 1.

A fuel injection device 14, mounted in the reactor head 9 is provided to inject and disperse a hydrocarbon fuel into the combustion air stream as it passes through orifice 13 and into combustion zone 1. The fuel used may be either a liquid or gaseous hydrocarbon. When a liquid hydrocarbon is used as a fuel, it is normal practice to preheat the fuel to increase its rate of vaporization for more rapid ignition. Gaseous hydrocarbon fuels may be injected at or near ambient temperatures without encountering delayed ignition problems. It is also normal practice to inject a small amount of air into the injection device to cool it and protect the metallic components of the fuel injection device from overheating damage.

It is desirable to maintain as high flame temperature as possible in the combustion zone 1 of the reactor, consistent with staying within the temperature service limits of the refractory linings in the reactor. Refractory linings of essentially pure aluminum or composite aluminum oxide - chromic oxide refractories are commonly used for this service.

In the examples shown in this invention application, the air preheat temperature and fuel injection rates used are selected to result in a theoretical flame temperature of about 3500° F. (1927° C.) in the combustion zone 1 of the reactor.

In addition to maintaining a high flame temperature in the reactor combustion zone 1, it is desirable to have some excess oxygen available after complete combustion of the fuel added through fuel injection device 14. This excess oxygen is consumed in the carbon black feedstock oil injection zone 2 of the reactor by burning a portion of the carbon black feedstock oil injected in zone 2. This additional combustion of feedstock hydrocarbons not only provides supplemental heat input into the carbon black forming process, but also generates large numbers of combustion nuclei, upon which carbon black particles are formed.

The combustion chamber in section or zone 1 of the reactor is formed in a conical shape with its maximum diameter at the upstream end of zone 1 and continuously decreasing in diameter in a downstream longitudinal direction, so as to continuously increase the velocity of the gaseous process stream as it moves in a downstream direction. The volumetric capacity of the combustion zone 1 is sufficient to allow time for complete combustion of the fuel injected into the air stream through the fuel injection device 14. Other combustion chamber shapes may be used advantageously by those skilled in the art, but the conical shape shown provides a practical means of providing a uniform, linear (non-swirling) flow of hot combustion process gases into the feedstock oil injection zone 2 of the reactor.

The feedstock oil injection Section 2 is a refractory lined zone consisting of a hot face refractory lining 11 of the same refractory material used in the upstream combustion zone 1. The hot face refractory lining 11 is encased in an insulating refractory material 15 to protect the section shell 16 from excessive temperatures.

The internal shape of the feedstock oil injection zone 2 is divided into two portions. The upstream portion 23 is a continuation of the internal conical shape of the combustion zone 1. The downstream portion 24 of Section 2 is a concentric cylindrical throat of fixed diameter.

The feedstock oil injection zone 2 contains two or more sets of feedstock oil injection nozzles 17, with each set of nozzles 17 being longitudinally and laterally spaced apart from each other. It is preferred to install one set of feedstock oil injection nozzles 17 in the cylindrical throat portion 24 of Section 2, and to install one or more sets of feedstock oil injection nozzles in the upstream conically shaped portion 23 of Section 2.

Each set of feedstock oil injection nozzles 17 consists of multiple hydraulic or gas atomizing nozzles uniformly spaced around the internal periphery of the reactor cross section and directed radially inwardly and generally perpendicular to the longitudinal centerline of the reactor. Instead of a right angle one may direct the nozzles and/or spray at other suitable angles e.g. 10°, 20°, 45°, 60°, 75°, from the right angle and these may be in both directions from the normal.

When producing conventional carbon blacks in a normal manner, only one set of feedstock oil injection nozzles is used. The selection of which set of feedstock oil injection nozzles to be used is partially determined by the "structure" desired in carbon black product being produced. Carbon black "structure" is a relative term relating to the degree of aggregation of carbon black particles to form aggregates in the carbon black product being produced. Carbon black "structure" may be measured effectively by American Society for Testing Materials (ASTM) Methods D-2414 and/or D-3493.

Carbon black products of lesser structure are normally produced by injecting carbon black feedstock oil into portion 24 of zone 2, where maximum velocity of the process gas stream occurs. Carbon black products of increased structure are normally produced by injecting the carbon black feedstock oil into portion 23 of zone 2, where lower process gas stream velocity occurs. When only two sets of feedstock oil injection nozzles are provided in the reactor, it is customary practice to locate one set of nozzles 17 in portion 24 of Section 2, and to locate the additional set of nozzles 17 at a point in portion 23 of Section 2, where the internal cross sectional area of the reactor is twice the internal cross sectional area of portion 24 of Section 2. It is well known to those skilled in the art that further adjustments of structure may be made by the addition of alkali metal salts into the combustion zone 1 of the reactor.

Figure 4:
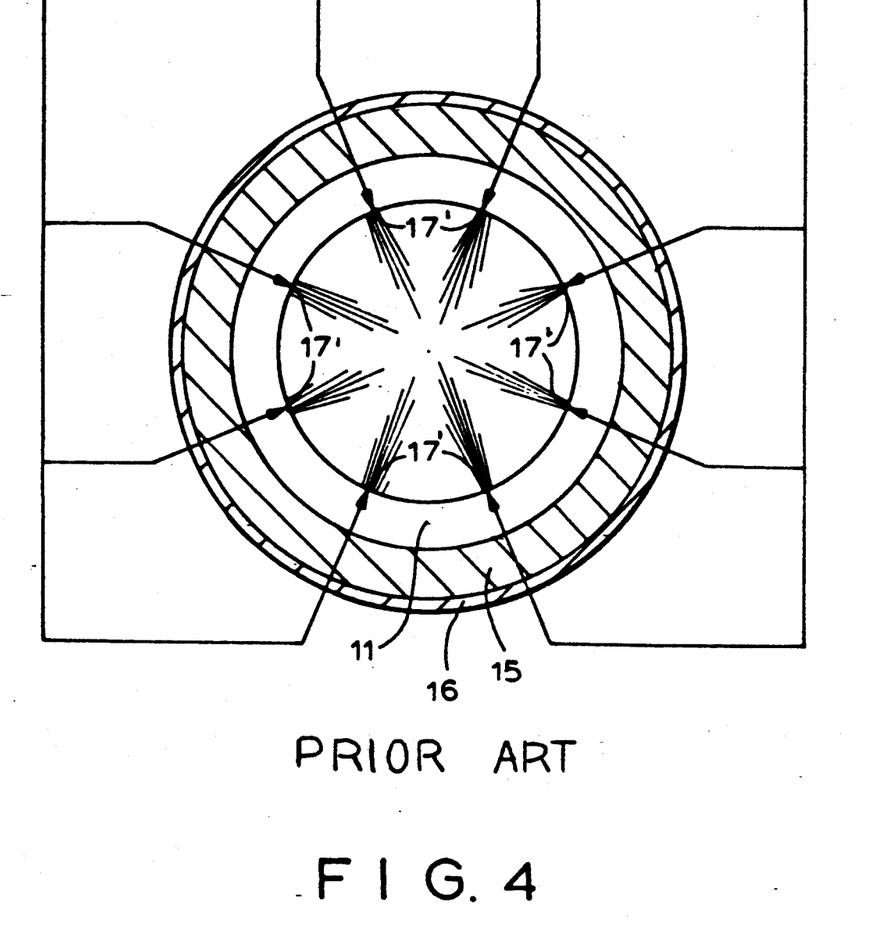
FIG. 4 is a cross sectional view at points A—A or B—B when producing carbon blacks by conventional procedures.

As previously stated, it is normal practice to utilize only one set of feedstock oil injection nozzles when producing conventional grades of carbon blacks. FIG. 4 is a typical cross sectional view of the carbon black feedstock oil injection when producing conventional carbon blacks in a normal manner. Carbon black feedstock oil, preheated to near its initial boiling point, is radially injected inwardly through multiple feedstock oil injection nozzles 17' into the hot process gas stream generated in the combination zone 1 of the reactor. Feedstock oil injection nozzles 17' are selected of proper size and spray angle to effect uniform distribution of atomized oil droplets over as much of the reactor internal cross section as can be practically achieved.

This method of carbon black feedstock oil injection forces rapid and intimate contact between the atomized feedstock oil droplets and the high temperature combustion gas process stream flowing from zone 1 of the reactor. This results in rapid vaporization of the carbon black feedstock oil, thermal dissociation of hydrogen from the feedstock oil hydrocarbons, and pyrolysis of the hydrogen deficient feedstock oil hydrocarbons into pyrolysis products of very high molecule weight.

Referring now to FIG. 1, these reactions, initiated in Section 2 of the reactor, continue at a very rapid rate as the reactant mass flows into and through section or zone 3 of the reactor. Reaction zone 3 is a cylindrical section, having an internal diameter approximately twice the internal diameter of portion 24 of zone 2. This reaction has hot face refractory lining 11, encased inside an insulating refractory lining 18, and enclosed by the external reactor shell 19.

As the endothermic process reactions continue in reaction zone 3 of the reactor, the reactant mass starts to cool and condensation of the pyrolized reaction products starts to occur on the surface of combustion nuclei generated primarily in zone 2 of the reactor. Condensation of the pyrolized reaction products create very small spherical particles, which continue to grow in size as long as condensable pyrolysis products are available.

It is likely that the condensed particles formed are initially highly viscous liquid or semi solid spherical particles when first formed. It is further likely that continued dehydrogeneration occurs under the high temperature conditions prevailing, which transforms these particles to solid particles, consisting primarily of elemental carbon.

Highly turbulent flow conditions are encountered in reaction zone 3, due to eddy currents created by the sudden enlargement of reactor internal diameter between zone 2 and zone 3. These turbulent flow conditions create intensive mixing of the reactant mass and promote collisions of particles while still in their formative stage. Under these conditions, particles easily fuse together upon collision, creating aggregates of particles, rather than individual spherical particles in final product form. This aggregation of carbon black particles is referred to as "structure".

The further dehydrogenation of particles continues to occur gradually as the reactant mass proceeds downstream into quench section or zone 4 of the reactor. Dehydrogenation is finally terminated in zone 4 by cooling the reactant mass below temperatures required for dehydrogenation.

This cooling of the reactant mass is accomplished by spraying water directly into the process stream through one or more quench spray nozzles 22 in reaction quench section or zone 4. This water is rapidly evaporated, thus cooling the process stream by heat absorption.

Reaction quench zone 4 consists of multiple cylindrical sections, lined with a temperature and spall resistant refractory lining 20, and encased in reactor shell sections 21. Multipled quench spray ports 22 are provided along the longitudinal length of zone 4, so that reaction residence times may be adjusted by quench position.

After cooling the process stream by quenching with water, the process stream containing entrained carbon black, flows to conventional downstream equipment where further heat transfer and separation of the carbon black from the remainder of the process stream is accomplished by conventional means. Those skilled in the art are familiar with the required downstream operations.

DESCRIPTION OF THE PROCESS

The process of this invention is carried out using the carbon black reactor previously described, except that the additional carbon black feedstock oil control loops are provided, so that two or more separately controlled streams of carbon black feedstock oil may be independently utilized in operation of the process.

It has been discovered that by separately controlling two or more carbon black feedstock oil streams and distributing these streams into separate segments of the hot combustion gas process stream generated in the combustion zone 1 of the reactor, it is possible to effect and control multiple carbon black forming reactions simultaneously in the same reactor, and thusly resulting in unique carbon black products that impart decreased hysteresis losses and/or increased treadwear resistance when compounded in automotive tire tread compounds. The term automotive includes all transportation vehicles such as motorcycles, automobiles, and trucks.

These carbon black products are also useful in other rubber compounding applications where low hysteresis loss, increased resilience, and increased abrasion resistance is desirable.

Operation of the reactor when utilizing the process of this invention follows generally the reactor operation for producing conventional carbon black products except for the method and control of injection of carbon black feedstock oil in zone 2 of the reactor.

In the instant process, part of the carbon black feedstock oil is injected and dispersed into a segment of the hot combustion gas stream in portion 23 of zone 2, with the remaining carbon black feedstock oil injected and dispersed in portion 24 of zone 2 in the remaining segment of the hot combustion gas stream not utilized in portion 23 of zone 2.

The relative proportions of feedstock oil injected in portions 23 and 24 and the relative proportions of the hot combustion gas stream utilized at the points of carbon black feedstock oil injection may be varied advantageously to produce different carbon black products.

Figure 2:
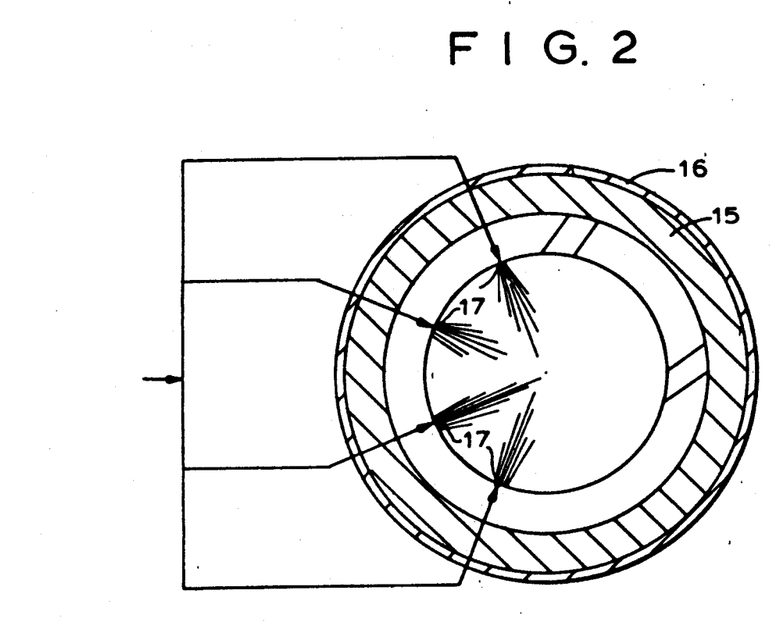
FIGS. 2 and 3 are cross sectional views of the carbon black reactor or furnace at points A—A and B—B shown in FIG. 1.
Figure 3:
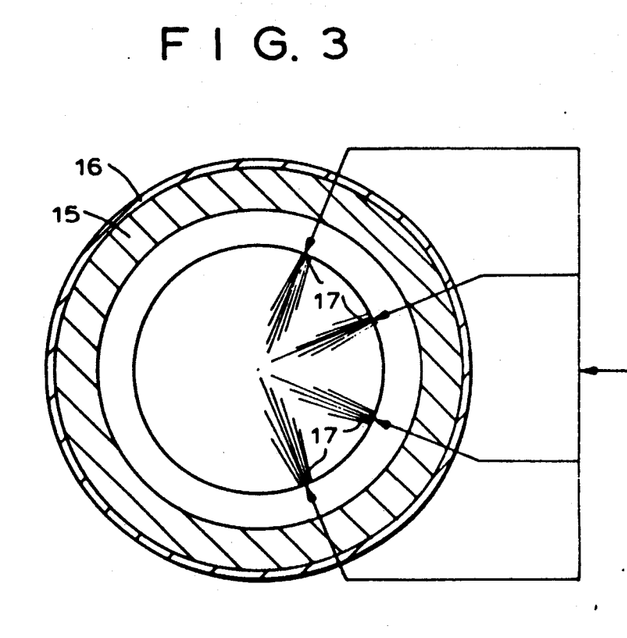

FIGS. 2 and 3 are illustrations of the feedstock oil injection in this process in which approximately 50 percent of the hot combustion gas stream is utilized in portion 23 of zone 2, and the remaining 50 percent of the hot combustion gas stream is utilized in portion 24 of zone 2. Generally, about 15 to 75 percent of the hot combustion gas stream can be utilized in portion 23 of zone 2, with the remaining 25 to 85 percent of the hot combustion gas stream being utilized in portion 24 of zone 2. In a preferred embodiment of this process, approximately 25 to 50 percent of the hot combustion gas stream is utilized in portion 23 of zone 2, with the remaining 50 to 75 percent of the hot combustion gas stream being utilized in portion 24 of zone 2.

Similarly, the proportions of carbon black feedstock oil being injected into portions 23 and 24 of zone 2 may be varied to produce carbon black products with unique properties. Generally about 10 to 60 percent of the carbon black feedstock oil may be injected into portion 23 of zone 2 with the remaining 40 to 90 percent of the carbon black feedstock oil being injected into portion 24 of zone 2. In a preferred embodiment of this process, 20 to 30 percent of the carbon black feedstock oil is injected into portion 23 of zone 2, with 70 to 80 percent of the feedstock oil injected into portion 24 of zone 2.

It is possible to operate the process with both streams of carbon black feedstock oil being injected at the same longitudinal position in the reactor, but it is preferred to separate the points of feedstock oil injection longitudinally in the reactor, since the dynamic properties imparted by the carbon black products of this invention are greatly improved if the residence time of the reactant mass created by the upstream feedstock oil injection is longer than the residence time of the downstream reactant mass by at least about one millisecond.

It is believed that the carbon black aggregates formed in reaction zone 3 of the reactor are different than those formed in the conventional process in that the aggregates formed by the process of this invention are composed of particles having a wider size distribution. It is believed that this difference in aggregate composition contributes to the improved dynamic properties of rubber compounds containing carbon black products produced by the process of this invention.

Of course, as stated earlier, it is clearly not the purpose of such postulations to have the invention limited thereto but only to the features of the process; apparatus and carbon black products described herein.

The following examples will serve to illustrate the present invention without being deemed limitative thereof. Parts where given, are by weight, unless indicated otherwise.

EXAMPLE 1

Carbon black products utilizing the process of this invention are produced in a carbon black reactor in accordance with FIG. 1 of the drawings. The dimensions of this reactor were as follows:

| Combustion Zone 1 | |
|---|---|
| Maximum Internal Diameter | 23 inches |
| Minimum Internal Diameter | 11 inches |
| Length | 72 inches |
| Feedstock Oil Injection Zone 2 | |
| Maximum Diameter, Portion 23 | 11 inches |
| Minimum Diameter, Portion 23 | 6 inches |
| Length, Portion 23 | 18 inches |
| Internal Diameter, Portion 24 | 6 inches |
| Length, Portion 24 | 12 inches |
| Reactor Zone 3 | |
| Internal Diameter | 12 inches |
| Length | 36 inches |
| Reaction Quench Zone 4 | |
| Internal Diameter | 12 inches |
| Effective Length | Variable (1 ft. to 4.5 ft.) |

Reactor operating conditions used to produce four products of this invention are shown in Table 1.

TABLE I

| | Experimental | | | |
|---|---|---|---|---|
| Operating Condition | Example A | Example B | Example C | Example D |
| Combustion Air Rate - SCFH (Standard Cubic Feet/Hour) | 140,300 | 134,800 | 135,100 | 135,300 |
| Combustion Air Preheat Temperature - °F. | 600 | 850 | 850 | 850 |
| Natural Gas Fuel Rate - SCFH (Standard Cubic Feet/Hour) | 14,280 | 12,030 | 12,010 | 12,120 |
| Theoretical Combustion Flame Temperature - °F. | 3,522 | 3,510 | 3,488 | 3,452 |
| Cooling Air Rate - SCFH (Standard Cubic Feet/Hour) | 600 | 600 | 400 | 400 |
| Feedstock Oil Injection in Portion 23, Zone 2 | | | | |
| Rate - Lbs./Hr. | 555 | 380 | 583 | 350 |
| Preheat Temperature - °F. | 400 | 450 | 440 | 450 |
| NTD - Distance From Nozzle Position To Discharge End Of Zone 2 - Inches | 26.5 | 26.5 | 26.5 | 26.5 |
| Reactor Internal Cross Sectional Area Used for Feedstock Oil Dispersion - % | 50 | 50 | 25 | 37.5 |
| Feedstock Oil Injection in Portion 24, Zone 2 | | | | |
| Rate - Lbs./Hr. | 1,400 | 1,540 | 1,373 | 1,381 |
| Preheat Temperature - °F. | 408 | 455 | 450 | 530 |

TABLE I-continued

| Operating Condition | Experimental | | | |
|---|---|---|---|---|
| | Example A | Example B | Example C | Example D |
| NTD - Distance From Nozzle Position To Discharge End Of Zone 2 - Inches | 6 | 6 | 6 | 6 |
| Reactor Internal Cross Sectional Area Used for Feedstock Oil Dispersion - % | 50 | 50 | 75 | 62.5 |
| QTD - Distance From Discharge End of Zone 2 to Quench Water Nozzle 22 Position Feet - Inches | 7-6 | 5-6 | 4-0 | 4-0 |

Each of the experimental examples were tested for analytical values along with four commercially produced conventional grades of carbon blacks for comparative purposes.

Each of these carbon blacks were also compounded into rubber formulation and the properties of the resultant rubber compounds were determined for comparison.

Impact resilience by the pendulum rebound method (ASTM D 1054) was determined for each of the carbon blacks in a natural rubber formulation (ASTM D 3192) and in a styrene-butadiene synthetic rubber formulations (ASTM D 3191). Resilience values were compared to those obtained using Industry Reference Black #6 as a reference.

Each of the carbon blacks were also compounded into the following tire tread rubber formulation:

| Ingredient | PHR |
|---|---|
| Duradene 750 (1) | 91.7 |
| Duradene 706 (1) | 33.3 |
| Carbon Black | 70.0 |
| Zinc Oxide | 3.0 |
| Stearic Acid | 2.0 |
| Sunolite 240 (2) | 2.0 |
| Flexzone 3-C (3) | 1.0 |
| Santocure MOR (4) | 1.0 |
| Sulfur | 2.0 |
| | 206.0 |

(1) Trademark of Firestone Tire & Rubber Co.
(2) Trademark of Sun Oil Co.
(3) Trademark of Uniroyal Chemical Co.
(4) Trademark of Monsanto Chemical Co.

Vulcanized test specimens were prepared representing each of the carbon blacks in the above tire tread rubber formulation. Dynamic Modulus, Loss Modulus, and Loss Tangent values were determined on each of the test specimens, utilizing an MTS Model 831 Elastomer Test System.

Additionally, each of the above compounds were used to produce multisection tread, radial type automotive test tires and these tires were subjected to roadway testing to determine rates of treadwear for each of the compounds containing both conventional and experimental grades of carbon black.

Carbon black analytical values, and rubber compound test values for each of the carbon blacks are summarized in Table II.

The analytical and rubber compound test values shown in Table II were derived by standardized test methods of the American Society for Testing Materials, or by proprietary test methods used by Witco Corporation. ASTM test procedures used are designated by the appropriate ASTM test number. Description of the Witco Corporation test procedures are given below as Tests A, B and C.

Comparison of Test Results

It is known to those skilled in the art that rolling resistance of automotive tread compounds correlates well with resilience test of those compounds at room temperature conditions.

Examination of the test results shown in Table II indicates that the carbon blacks produced by this invention impart improved resilience, as measured by the pendulum rebound method, when compared with conventionally produced carbon blacks of similar treadwear resistance.

For comparison, N351 carbon black may be compared with Example A of this invention. Likewise N339 and N299 may be compared with Example B, and N234 may be compared with Examples C and D of this invention. In every case, the carbon blacks of this invention are shown to impart improved compound resilience, in both natural rubber and synthetic rubber compound recipes.

It is also known by those skilled in the art that rolling resistance of an automotive tire tread compound correlates well with hysteresis loss of those compounds when tested under dynamic conditions at room temperature. Hysteresis loss can be measured directly by dynamic testing equipment and relative hysteresis of various compounds may be derived by determining Loss Tangent. (Loss Modulus, E'', divided by Elastic Modulus, E').

TABLE II

| Test | Units | Test Method | Conventional | |
|---|---|---|---|---|
| | | | N351 | N339 |
| Analytical | | | | |
| Iodine Number | Mg. I$_2$/gm C.B. | (ASTM D-1510) | 66.8 | 89.4 |
| Nitrogen Surface Area | M$^2$/Kg. | (ASTM D-3037) | 70.0 | 92.3 |
| N.S.A. - Iodine No. | — | | 3.2 | 2.9 |
| CTAB Surface Area | 10$^3$ M$^2$/Kg. | (ASTM D-3765) | 73.1 | 90.5 |
| Mean Aggregate Dia. | Nanometers | (Witco Method) | 193.7 | 176.1 |
| Tint Strength vs ITRB | Percent | (ASTM D-3265) | 98.6 | 109.2 |
| DBP Absorption No. | cc/100 gms. | (ASTM D-2414) | 121.0 | 120.8 |
| Compressed DBP Abs. No. | cc/100 gms. | (ASTM D-3493) | 93.5 | 94.4 |
| Pour Density | lbs./ft.$^3$ | (ASTM D-1513) | 22.0 | 22.0 |
| Rubber | | | | |
| Pendulum Rebound Resilience vs. Industry Reference Black #6 | | percent (ASTM D-1054) | | |
| in Natural Rubber (ASTM D-3192) | | percent (ASTM D-1054) | +1.7 | −1.5 |

TABLE II-continued

| | | | | |
|---|---|---|---|---|
| in Synthetic Rubber (ASTM D-3191) | | percent (ASTM D-1054) | +2.9 | −0.4 |
| Dynamic Rubber Properties | | | | |
| in Treadwear Recipe | (Load/Load Mode) | (12 Hertz) (70° F.) | | |
| Elastic Modulus, E' | lbs/in.$^2$ | (Witco Method) | 1,719 | 1,954 |
| Loss Modulus, E'' | " | " | 400 | 470 |
| Loss Tangent × 10$^3$ | E''/E' | " | 232 | 240 |
| Dynamic Rubber Properties | | | | |
| in Treadwear Recipe | (Load/Displ. Mode) | (12 Hertz) (70° F.) | | |
| Elastic Modulus, E' | lbs/in.$^2$ | (Witco Method) | 1,450 | 1,492 |
| Loss Modulus, E'' | " | " | | |
| Loss Tangent × 10$^3$ | E''/E' | " | 237 | 259 |
| Treadwear Index vs N339 | percent | (Witco Method) | 89.6 | 100.0 |

| | Conventional | | Invention | | | |
|---|---|---|---|---|---|---|
| | | | Example | Example | Example | Example |
| Test | N199 | N234 | A | B | C | D |
| Analytical | | | | | | |
| Iodine Number | 104.8 | 118.1 | 59.8 | 78.1 | 87.2 | 105.4 |
| Nitrogen Surface Area | 107.8 | 119.1 | 80.0 | 88.5 | 108.2 | 116.0 |
| N.S.A. - Iodine No. | 3.0 | 1.0 | 20.2 | 10.4 | 21.0 | 10.6 |
| CTAB Surface Area | 102.4 | 115.4 | 75.2 | 87.3 | 107.7 | 113.5 |
| Mean Aggregate Dia. | 180.3 | 165.9 | 197.3 | 186.7 | 173.2 | 175.4 |
| Tint Strength vs ITRB | 112.8 | 123.1 | 94.1 | 106.0 | 118.0 | 119.8 |
| DBP Absorption No. | 123.5 | 124.0 | 136.7 | 132.8 | 139.3 | 133.4 |
| Compressed DBP Abs. No. | 106.8 | 104.0 | 100.6 | 107.8 | 112.2 | 107.9 |
| Pour Density | 22.0 | 21.6 | 19.8 | 20.7 | 20.2 | 21.2 |
| Rubber | | | | | | |
| Pendulum Rebound Resilience vs. Industry Reference Black #6 | | | | | | |
| in Natural Rubber (ASTM D-3192) | −3.4 | −5.0 | +2.1 | −1.0 | −2.6 | −4.6 |
| in Synthetic Rubber (ASTM D-3191) | −1.8 | −3.8 | +3.7 | +1.4 | −0.6 | −2.4 |
| Dynamic Rubber Properties in Treadwear Recipe | | | | | | |
| Elastic Modulus, E' | 2,190 | 2,466 | 1,592 | 1,991 | 2,512 | 2,558 |
| Loss Modulus, E'' | 523 | 629 | 320 | 439 | 568 | 595 |
| Loss Tangent × 10$^3$ | 239 | 255 | 201 | 221 | 226 | 233 |
| Dynamic Rubber Properties in Treadwear Recipe | | | | | | |
| Elastic Modulus, E' | 1,605 | 1,657 | 1,384 | ·1,574 | 1,763 | 1,732 |
| Loss Modulus, E' | 416 | 482 | 287 | 371 | 456 | 464 |
| Loss Tangent × 10$^3$ | 259 | 291 | 207 | 236 | 259 | 268 |
| Treadwear Index vs N339 | 99.1 | 108.2 | 89.3 | 100.0 | 107.6 | 111.0 |

TEST A

Method for Determination of Aggregate Size Diameter, ASD

Equipment:
1. PARTICLE SIZE ANALYZER, "NICOMP 270"
   Available from:
   Pacific Scientific Corp.
   Hiac/Royco Instrument Division
   141 Jefferson Dr.
   Minlo Park, Calif. 94025
2. CELL DISRUPTOR, "ARTEK Model 300" with standard ¾" Titanium Tip).
   Available from:
   ARTEK Systems Corporation
   170 Finn Court
   Farmingdale, NY 11735
3. COMBINATION SONIC BATH & MAGNETIC STIRRER
   Standard laboratory model, approximately 500 ml capacity.

Method

A sample of carbon black is dispersed in water and then placed in the Nicomp 270 analyzer for the measurement of the mean aggregate size diameter. The Nicomp machine utilizes the technique of Dynamic Light Scattering (DLS) or, Photon Correlation Spectroscopy from the Brownian motion of the colloidal sized aggregates and proprietary software to generate size measurements.

Procedure

Measure 1 g. of carbon black into 80 ml water in a small beaker with a magnetic spin bar. Place in the sonic bath for three minutes and while still mixing withdraw 2 drops of solution with a dropper. Add the two drops of aqueous carbon black suspension and 1 drop of Trixon X* solution to 50 ml. of water in a small beaker (approx. 20 ppm). Insert the tip of the "Artek Dismembrator" probe into the beaker and sonicate for 5 minutes at 80% of indicated output power.
*Trademark of Rohm and Haas Co.

The suspension is then cooled to room temperature and transferred to the Nicomp 270. The run mode is activated and approximately two million counts taken to ensure stability of the output data. The Gaussian distribution/intensity combination is preferred for the current correlation model.

TEST B

Dynamic Property Measurement

Machine: MTS Model 831 Elastomer Test System
MTS Systems Corporation
Box 24012

Minneapolis, Minn. 55424
Software: MTS 773 BASIC Version 02,08A
(Software includes application programs furnished by MTS to perform dynamic property measurement)
Sample: Sample is a 2" diameter by 1" high cylinder of molded elastomeric compound.
Cure: The sample is vulcanized 20 minutes at 320° F. and then rested 24 hours prior to test.
Test Conditions: All samples were tested at 12 Hertz. Test temperature was 70° F. Samples were preconditioned for 1 hour at the specified temperature. The specimens were tested under two sets of dynamic test control. Thirty preconditioning cycles were run before the software captured test results.
(A) Mean load 132 psi and dynamic load 132 psi in compression.
(B) Mean load 132 psi in compression and dynamic displacement of 0.0350" stroke resulting in 7.0% deflection (peak to peak).

TEST C
Method of Treadwear Index Determination

Using the formulation shown below, tread sections having five straight ribs are cured in a flat mold in a laboratory press for 45 minutes at 293° F. Eight of the precured sections, one of which contains a control carbon black, are applied in a random order to a new P195/75R14 tire carcass from which the original tread has been ground away. A commercial precured tread recapping process is utilized to apply the experimental sections. Four tires each with identical sections are built and run for 8,000 miles following an initial 500 mile break in. Inflation pressure is 32 psi and wheel load 1130 lbs. Tires are rotated in a forward X pattern and measured at each 1,000 mile interval. Wear rates of 80 to 100 miles/mil are maintained on the control sections. Regression equations are developed from the last five measurements and are used to calculate the 8,000 mile loss. From these loss values indexes are calculated with the control sections assigned a value of 100.

| Treadwear Formulation | |
| --- | --- |
| Ingredients: | PHR |
| Duradene 750 | 91.7 |
| Duradene 706 | 33.3 |
| Carbon Black | 70.0 |
| Zinc Oxide | 3.0 |
| Stearic Acid | 2.0 |
| Sunolite 240 | 2.0 |
| Flexzone 3-C | 1.0 |
| Santocure MOR | 1.0 |
| Sulfur | 2.0 |
| Total weight | 206.0 |

Loss Tangent values were determined for each of the compounds containing conventionally produced carbon blacks and carbon blacks produced by this invention, and the data is presented in Table II. Loss Tangent values were determined for two modes of dynamic load inputs at 70 F. Dynamid load input frequency was controlled at 12 Hertz, since this is the approximate rolling frequency of the test tires at a speed of 55 miles per hour.

Comparison of the relative hysteresis data (Loss Tangent values) again show that the carbon blacks produced by this invention impart lower hysteresis to the tread compounds that conventionally produced carbon blacks of equal treadwear resistance.

Figure 5:
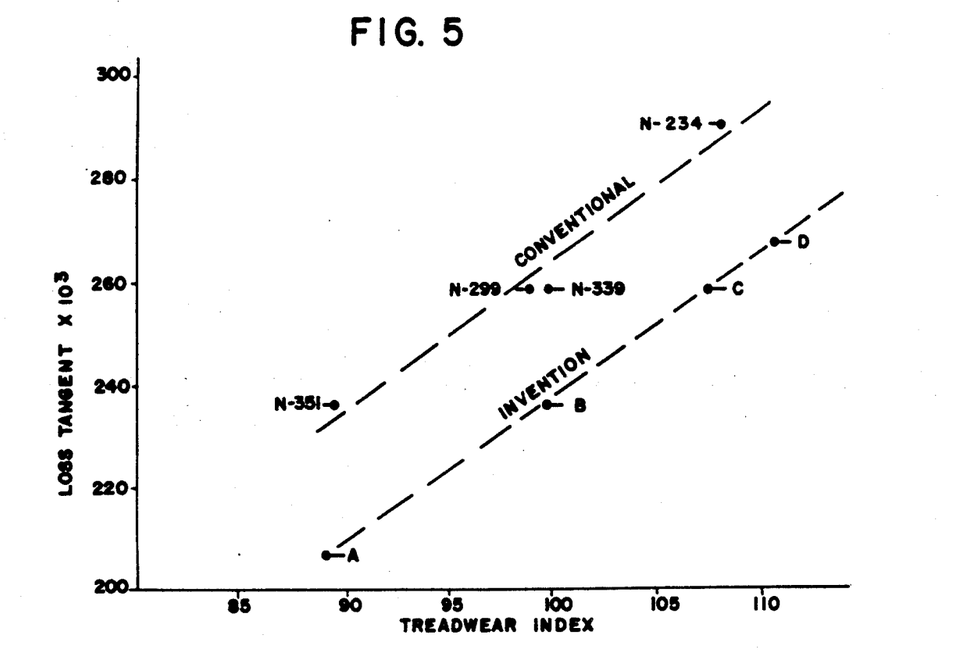
FIGS 5 and 6, respectively, are graphic representations of the Loss Tangents versus Treadware Indices of conventionally produce carbon blacks compared with carbon blacks produced by this invention.
Figure 6:
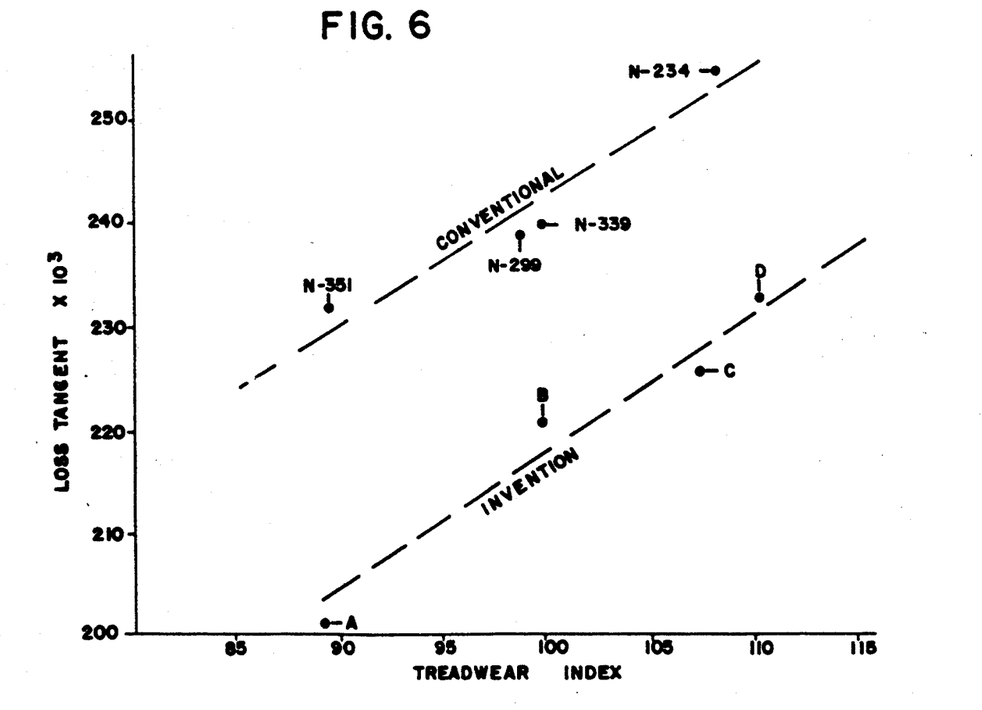

It can be readily seen from an examination of the graphic representations shown in FIGS. 5 and 6 that an improved hysteresis—treadwear relationship is imparted to automotive tread compounds by the use of the carbon blacks produced by this invention.

We claim:

1. A process for producing carbon black in a reactor vessel utilizing combustion gases and feedstock oil, said process comprising: supplying a linear, substantially non-swirling flow of combustion gases into a feedstock oil injection zone in said reactor, supplying at least two independently controlled streams of carbon black feedstock oil into separate segments of said flow of combustion gases in said feedstock oil injection zone wherein separate carbon black forming reactions are respectively effected in separate segments of said flow of combustion gases, and immediately thereafter supplying said combustion gas segments in which said separate carbon black forming reactions have been effected into an aggregate-forming zone whereby a carbon black product is produced which, when compounded in rubber compositions, provides said rubber compositions with improved hysteresis loss and treadwear resistance properties.

2. A process as defined in claim 1 wherein one of the separate carbon black feedstock oil input streams and reactions is upstream in the reactor and a second of the separate carbon black feedstock oil input streams and reactions is downstream in the reactor.

3. A process as defined in claim 2 wherein the residence times of the reactants in said separate portions of the reaction zone differ by at least one-half of a millisecond and preferably by at least one millisecond.

4. A process as defined in claim 2 wherein said separate input streams of carbon black feedstock oil are spaced apart longitudinally in said reaction vessel.

5. A process as defined in claim 2 wherein the separate input streams are spaced laterally in the internal cross section of said reaction vessel.

6. A process as defined in claim 5 wherein the upstream input zone has at least about twice the cross-sectional diameter as the downstream input zone.

7. A process as defined in claim 6 wherein the upstream input and reaction zone is conical and the downstream input and reaction zone is substantially cylindrical.

8. A process as defined in claim 7 wherein the amount ratio of the upstream feedstock oil to the downstream feedstock oil varies from about 10:90 to 60:40.

9. A process for producing carbon black wherein feedstock oil is injected into a stream of combustion gases in a reactor, said process comprising selectively forming different size carbon black particles in generally separate reaction mass segments of said combustion gas stream and immediately thereafter supplying said separate reaction mass segments of said combustion gas stream to an aggregate-forming zone in said reactor to form carbon black aggregates which exhibit improved treadwear resistance and hysteresis properties when compounded in automotive tire tread compositions.

10. The process of claim 9 wherein the combustion gas stream comprises a linear, substantially non-swirling stream which is supplied to a feedstock oil injection zone in said reactor, said stream including a first combustion gas stream segment and a second combustion gas stream segment, said first segment containing from approximately 15% to 75% of the total combustion gas stream, and said second segment containing from approximately 85% to 25% of the total combustion gas stream.

11. The process of claim 10 wherein said first segment contains from approximately 25% to 50% of the total combustion gas stream and the second segment contains from approximately 75% to 50% of the total combustion gas stream.

12. The process of claim 10 wherein said first and second segments of said combustion gas stream each comprise approximately 50% of the total combustion gas stream.

13. The process of claim 10 wherein from approximately 10% to 60% of the total feedstock oil is supplied to said first combustion gas stream segment and from approximately 90% to 40% of the total feedstock oil is supplied to said second combustion gas stream segment.

14. The process of claim 10 wherein from approximately 20% to 30% of the total feedstock oil is supplied to said first combustion gas stream segment and approximately 80% to 70% of the total feedstock oil is supplied to said second combustion gas stream segment.

15. The process of claim 10 said feedstock oil injection zone includes an upstream portion and a downstream portion, said upstream portion having at least approximately twice the cross-sectional area of the downstream portion.

16. The process of claim 15 wherein first and second carbon black feedstock oil input streams are supplied to each of said first and second combustion gas stream segments in the upstream and downstream portions of said feedstock oil injection zone to effect separate carbon black forming reactions in said respective first and second combustion gas stream segments.

* * * * *